United States Patent [19]
Yang et al.

[11] Patent Number: 5,896,573
[45] Date of Patent: Apr. 20, 1999

[54] CHANNEL ASSIGNMENT SELECTION REDUCING CALL BLOCKING AND CALL CUTOFF IN A CELLULAR COMMUNICATION SYSTEM

[75] Inventors: Cheng Yang, Plano; David W. Matula, Dallas, both of Tex.

[73] Assignee: Southern Methodist University, Dallas, Tex.

[21] Appl. No.: 08/843,186

[22] Filed: Apr. 14, 1997

Related U.S. Application Data

[63] Continuation of application No. 08/442,336, May 16, 1995, Pat. No. 5,633,915.

[51] Int. Cl.$^6$ .................................................. H04Q 7/20
[52] U.S. Cl. ........................... 455/453; 455/437; 455/443
[58] Field of Search .............................. 455/422, 435, 455/436, 446, 450, 451, 452, 453, 509, 510, 512, 513, 404, 449

[56] References Cited

U.S. PATENT DOCUMENTS

| | | | |
|---|---|---|---|
| 4,670,899 | 6/1987 | Brody et al. | 455/453 |
| 5,025,254 | 6/1991 | Hess | 455/509 |
| 5,093,925 | 3/1992 | Chanroo | 455/33 |
| 5,101,502 | 3/1992 | Felderman et al. | 455/509 |
| 5,241,685 | 8/1993 | Bodin et al. | 455/453 |
| 5,371,780 | 12/1994 | Amitay | 455/512 |
| 5,371,899 | 12/1994 | Kuznicki et al. | 455/509 |
| 5,379,448 | 1/1995 | Ames et al. | 455/453 |
| 5,570,411 | 10/1996 | Sicher | 455/512 |
| 5,596,625 | 1/1997 | Leblanc | 455/404 |
| 5,640,677 | 6/1997 | Karlsson | 455/449 |

*Primary Examiner*—Dwayne D. Bost
*Assistant Examiner*—Tracy M. Legree
*Attorney, Agent, or Firm*—Oblon, Spivak, McClelland, Maier & Neustadt, P.C.

[57] ABSTRACT

Cellular communication systems supporting high utilization geographic regions having extensive cell overlap segments that collectively contain a substantial portion of the mobile units. A system and method for channel assignments incorporating selection from alternative transceivers defining overlapping cells is provided with load balancing to reduce call blocking. The system incorporates selective multiple handoffs responsive to channel assignment requests both to extend load balancing and also to substantially avoid call cutoff when active mobile units cross cell boundaries into possibly saturated cells.

3 Claims, 14 Drawing Sheets

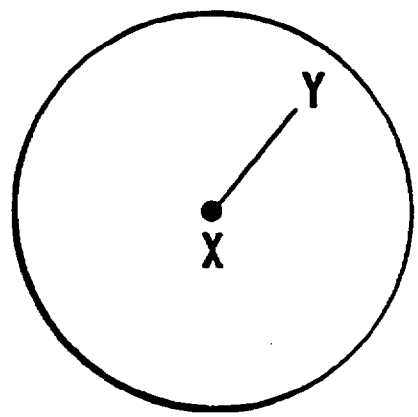
FIG. 9a
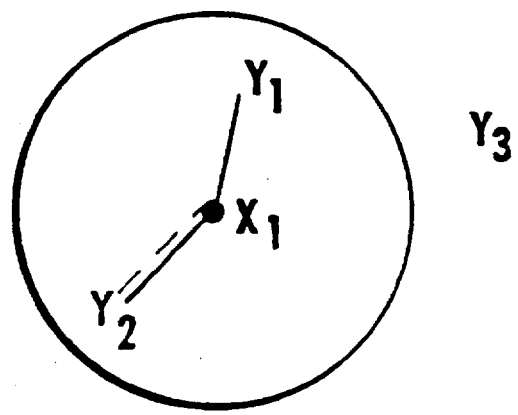
FIG. 9b
$Y_i \text{\_\_\_\_\_} X_j \text{-----} Y_k \text{\_\_\_\_\_} X_l \text{-----} Y_m$
FIG. 9c

CHANNEL ASSIGNMENT SELECTION REDUCING CALL BLOCKING AND CALL CUTOFF IN A CELLULAR COMMUNICATION SYSTEM

This is a Continuation of application Ser. No. 08/442,336, filed on May 16, 1995 now U.S. Pat. No. 5,633,915.

BACKGROUND OF THE INVENTION

1. Field of the Invention

This invention relates to cellular communication systems, such as cellular telephone or personal communication services (PCS), and more particularly relates (a) to a multilayer cellular design in which multiple cellular arrangements (each with an assigned group of frequencies) provides a substantial degree of coverage overlap, and (b) to a method for allocating and transferring calls among the cellular arrangements.

2. Discussion of the Background

Conventional cellular systems have a hierarchical system design. A mobile switching office is attached by voice and data links to a number of base stations, each of which is connected to an antenna with a set of frequencies, each of which can connect to a number of mobile units (HHTs) via a radio channel in its predetermined portion of region coverage. An HHT can be a hand-held telephone or other mobile unit communicating voice or data over an assigned frequency channel to a selected base station. Throughout this specification, when voice communication is discussed, the communication channel created and the communication links could be purely data, voice or hybrid voice and data communication.

The mobile switching office and base stations have the computing power to process communicating an HHT's requests for service and to determine which frequency channel assignment will be initially allocated for communicating with the HHT, as well as any hand-off reassignment of channel and antenna necessitated by the HHT moving beyond the cell of the currently assigned antenna.

A common approach to cellular design is illustrated in FIG. 1 and includes a hexagonal lattice of cells with a single antenna covering each cell. The actual portion of the region covered by an antenna may be slightly larger than the hexagonal cell, as shown by the circular region of radius R in FIG. 1. The overlap of cells at the cell boundaries identifies the cell segments in which conventional systems may hand-off the channel assignment and antenna for an HHT moving across a call boundary. However, this cellular overlap covers only a small portion of the geographical area of a cell.

When an HHT with an assigned channel moves to a new cell where the antenna covering the cell has an available channel, the hand-off changing the antenna and frequency for both transmit and receive is transparent to the user. If the antenna in the new cell has no available channel, the call in progress is cut off, this being an unfortunate problem with current cellular systems.

The frequencies used for channel assignments are limited. In a cellular systems the frequency set allocated to a given cell may be reused at some specified distance such as the distance D shown in FIG. 1. This distance must be large enough so as to not create co-channel interference with HHTs using the same channel in different cells. The distance D in FIG. 1 allows the bold-faced seven-cell cluster to be repeated to cover an arbitrarily large geographical region with all frequencies reused repetitively at the same distance D.

The literature teaches various systems (see, for example, FIG. 4 of "The Cellular Concept," V. M. MacDonald, Bell Systems Technical Journal, Vol. 58, No. 1, Pages 15–41, January, 1979, incorporated by reference herein) of patterns of clusters of distinct frequency sets which may be reused at a certain safe distance from each other.

In cellular systems with such frequency reuse allowing coverage of arbitrarily large regions, there is still a problem in that the number of telephone calls that may be active in a given cell at any moment are limited by the number of frequencies allocated to that cell. Some digital systems have improved the total number of calls possible in each cell by multiplexing calls and employing more complex HHTs. Still, the number of active calls in any given cell is limited. When this number is reached by active calls in a cell and not near the boundary where they could be handed off, any new HHT in that cell requesting service will be blocked. Note that blocking can occur even though neighboring cells have available channels.

One solution to the problem of excessive call blocking and call cut-offs is to reduce the cell size, providing a multitude of low power microcells which increases the total available channels over a geographical region by increasing frequency reusage. However, the power of a microcell cannot be reduced too low or the reliability of communication will suffer. Moreover, decreases in transceiver power cause the background noise to signal strength ratio to grow requiring greater HHT complexity to reject the noise levels incurred. Furthermore, as the call size decreases, moving HHTs will require more hand-offs, increasing system overhead and the chance that moving active HHTS will be cut off. This increases the risk of the entire system or portions thereof going into a "thrashing" situation. During a "thrashing" situation, cut-offs of existing calls become a real risk. The cut-off of an active telephone call is considered more disruptive than the unavailability of a channel to a new request for service. Thus, the mobility of HHTs over the region and the level of background noise serve to yield a practical limit to the minimum cell size that may be provided over a region. When the cell size is as small as practical the inability to operate using a majority of channel capacity without noticeable call blockage is a problem with current systems.

Another solution is to have different sets of frequencies occur with different reuse distances, yielding layers of various size cells, where the smaller size cells possessing increased frequency reuse may serve only a non-contiguous portion of the region supplementing the contiguous cell region of another layer. Such multiple reuse patterns add complexity to the system with the smaller cell portion still susceptible to more background noise and greater need for hand-offs. Furthermore, the number of assignable channels in multiple frequency reuse distance systems may vary so as to provide considerably less capacity in portions of each original cell causing surges in those areas to be more disruptive.

Another problem with current systems is that the boundary area between cells is a portion of the region where relatively small movement of an HHT can necessitate a hand-off, and oscillatory movement of an HHT across a boundary or circular motion around the intersection point where three adjacent hexagons meet can greatly increase the occurrence of hand-off overheads while at best preserving a low grade of signal strength to an HHT at such a local in the region. There is a need in cellular systems to avoid the disruptive behavior of service to HHTs happening at the cell boundaries.

Another problem that exists in conventional systems is that a failure, a repair, or the line of a given antenna, which takes the cell off the air, will result in a dead area of coverage in which no available service can occur in that cell for some period of time, and if an HHT moves into that cell while communication is in progress, the communication will be cut off.

The current cellular system has two service providers, and the direction of PCS service, particularly in metropolitan areas, is to have two or more providers offer competing cellular service over the same broad region. The partition of available channels to a multitude of providers, each operating independently and each subject to the degradations in service previously mentioned occurring at more exaggerated levels, compared to the channels available in each system results in poorer overall service. It is a problem to promote competition in cellular PCS service without degrading the level of service that could be provided by the total channels available.

SUMMARY OF THE INVENTION

One of the objects of Applicants' invention is to provide a given HHT located in the system's service area with a multitude of broadcast transceivers that the system may use for the communication between an HHT and the land line side of the cellular system or between individual cells or between other HHTs in the systems This may be readily visualized by having repeat copies of the existing prior art cellular arrangement which are set up so as to overlay the cells in the new layers with the layers shifted geographically from each other. From each point in the service region covered by the entire cellular system, each point will be removed from a cell boundary in at least one layer (i.e. being closer to the center of a cell in at least one of the layers) This can be seen graphically in FIGS. 2c and 2d, in which the seven-cell pattern of FIG. 2a is repeated by a three-layer replication where the midpoints of the cells in layers 2 and 3 are placed at the corners of the hexagonal cells which form the system shown in FIG. 1 (also FIG. 2a). It should be noted that this invention is being illustrated using three layers; however, the system can be constructed with any number of layers being used, so long as two or more layers are employed for a given region (FIG. 2b).

As can be seen from FIGS. 2c and 2d, what occurs in a three-layer system is a "triangular grid," in which any HHT in a given triangle is able to receive service from transceivers at any of the corners of the triangle. In this type of arrangement, each transceiver of the three-layer system will generally have one-third the number of the frequencies that would be allocated to a hexagonal cell in the single layer system. It should be noted that current conventional systems might have multiple frequencies for each cell.

As can be seen from FIG. 3, three transceivers for a preferred embodiment of our three-layer system (labeled transceiver levels a, b and c, respectively) can service an HHT under the control of the Cell Site Controller (CSC). This CSC may control other transceivers in the local region on various levels. The three levels a, b and c correspond to the "corners" of a triangle such as is shown in FIGS. 2c and 2d. The CSC can perform the frequency assignments from an appropriate level a, b, or c transceiver and determine some hand-offs in this embodiment.

A new design is shown in FIG. 4 in which the Base Station Controller (BSC) is attached by voice and data links to a number of CSCs, each of which is connected to a number of transceivers, each of which can connect to a number of mobile units (HHTs) in its predetermined portion of region coverage. An HHT can be a hand-held telephone or other mobile unit communicating voice or data over an assigned frequency channel to a selected transceiver.

The CSCs and BSCs have the computing power to process the signal strength data from one or more transceivers communicating with an HHT request for service and to determine which frequency channel assignment through which transceiver will be initially allocated for communicating with the HHT, as well as any hand-off reassignment of channel and transceiver necessitated by the HHT moving beyond the cell of the currently assigned transceiver.

As noted above, each of the layers could be serviced by a different service provider, presuming that some standard degree of cooperation existed between the providers, such as is shown in the alternative embodiment of this invention in FIG. 4. With this type of arrangement, what is generally referred to as the "A" carrier in a region could provide service for one layer through the level 1 CSC shown in FIG. 4, and the "B" provider provides a second layer using the level 2 CSC controller in FIG. 4. A third layer could be shared by the two providers, and, if additional layers are used, the rights to service any remaining layer(s) could be auctioned in the same manner as other frequency auctions have taken place, increasing revenue to the government. In this alternative embodiment, the determination of frequency assignment and the employment of hand-offs is controlled at the base station level in the hierarchy by some approved standard protocol. The system of this embodiment of this invention could, of course, be serviced by a single provider providing the service on all layers as well.

The previous problem of traffic surge that is discussed above is ameliorated in that a surge in traffic which might occur over a particular cell of FIG. 1 may be handled by only one antenna in the prior art system of FIG. 1. For example, in a system having the three-layer arrangement covering the area shown in FIG. 2c, seven different transceivers would be available to help with calls that would formally have existed in the area of a single hexagonal cell allowing approximately 2.33 times as many calls as would previously have been possible. Computer simulations have shown that the percentage of the total system frequency capacity used by this invention with little or no blockage is significantly higher in this system than in the prior art single-layer system. Call blocking is the situation where no service can be provided directly or with a hand-off for a new request in a cell.

In FIG. 5, an example of a road passing through a three-layer system is shown in which the improvement over the conventional arrangement is obvious. The capacity along the road shown is at least 1.54 times the capacity of a conventional system. For example, using two frequency channels per transceiver in the triangular grid corresponding to six per transceiver in the hexagonal system, it is noted that the thirty-seven highlighted transceivers in the triangular grid serve the road with seventy-four channels maximum capacity, contrasted with only eight transceivers of the hexagonal grid providing forty-eight channels maximum capacity to the road, providing the 1.54 capacity increase. The burst area providing a clear 2.33 times improvement over a conventional single-cell site in terms of capacity is also shown in FIG. 5.

FIG. 6a shows forty-three points requesting service for individual HHTs over an eight hexagonal-cell region where each cell has a capacity of six channel assignments. Note that two cells are at capacity where furthermore the eleven request points in one of these cells resulted in five blocked calls, and the eight points in the other capacitated cell resulted in two blocked calls. Although the total requests were only 43/48=89.6% of total channel capacity, only 36 requests representing 75% of the capacity were handled by this conventional cellular system. In generals, any surge in traffic in a given area of current art cellular systems may result in blocked calls (i.e. no frequency pair channel is available), even though the average utilization of the network might be significantly less than half or smaller than the network's peak capacity. This is especially true in an urban area where a given number of calls may originate from some specific area at some specific time considerably more frequently than the average number of calls over the area.

As can be seen from FIGS. 6a and 6b, the probability of potential blockage of a call or the prevention of a call from continuing as an HHT moves through the system is determined by the portion of the cells which are saturated (the shaded areas in the figure) by having all possible transceiver frequencies in use. A saturated cell is a cell in which all transceivers have all of their frequency capacity in use. In a conventional hexagonal systems, blockage and saturation essentially occur at the same time. In this invention, on the contrary, saturation does not imply blockage of an area. In facts, blockage occurs only after a substantially greater number of service requests have been received and frequencies allocated employing this invention's hand-off strategy. Using FIGS. 6a and 6b as a comparison, the shaded area in a conventional system that is blocked is greater than the very small shaded area of the triangular grid shown in FIG. 6b. In FIG. 6a, 25% of the coverage area would be blocked by two saturated cells. In FIG. 6b, about 4% is potentially blocked, even after having serviced all forty-three requests corresponding to FIG. 6a. Each of the dots in both FIGS. 6a and 6b represent HHT 100 users. In FIG. 6b, using the three-layer approach, six of the fourteen transceiver sites not on the boundary will still have a total of six available channels for the coverage area. The twenty-two transceiver sites on the boundary would be servicing twenty-one calls in the region, allowing an additional twenty-three frequency channels in total to be available for service internal or external to the region shown. Only the 4% saturated area shaded would be prevented from accepting a new call by virtue of a lack of a channel for immediate assignment. As will be discussed below, even this problem of the 4% saturated area situation can be ameliorated to avoid blockage by the hand-off mechanism of this invention Assignment in the triangular grid of a preferred three-level multilayer arrangement system is an advantage of this invention with respect to improved utilization, and, therefore, improved coverage even without using the improved hand-off feature of this invention, which, in and of itself, is a useful and non-obvious improvement over prior art arrangements.

By having this multilayer arrangement, various mechanisms are used for allocating new calls in a given cell to the available frequency. This allocation from alternative transceivers of different levels may be accomplished by either a strongest signal, a load balancing or a proportional availability strategy. All of these strategies provide for a fine-tuning of the network so as to minimize the number of hand-offs of moving HHTs across cell boundaries while still maintaining a reasonable level of available new service in most regions and allowing for the greatest expansion for "surge" type of problems. These allocation methods are discussed below in the detailed description of this invention and are a significant feature and object of this invention.

Furthermore, by using the hand-off structure of this invention, a "space diversity channel reassignment" mechanism may be employed for providing service to a new call in a triangular cell where all the transceivers at the three corners of the triangle currently have all frequencies in use. This hand-off embodiment is also discussed below and may be used in connection with the allocation mechanism embodiment discussed below.

Furthermore, this invention improves the finding of a "hand-off path," where the sequence of hand-offs results in an available frequency and the remote cell being utilized in the most efficient manner, and the frequency that was previously used becoming available within the current cell to be allocated to a new call. This lessens the chance of a blocked call and increases the average utilization of the entire system.

Prior art systems such as Ito, S, "Design for Portable Telephone Methods for Enable Initiating and Receiving Calls from a Vehicle", Iwatsu Electric Co., Ltd., Tokyo, Japan VTC 1989, Pages 136–141, which use a two-layer system, suffers from problems in that it is primarily designed for handling only one-dimensional fast-moving traffic and does not have the benefits of frequency allocation and reassignment strategies, as is the case in Applicants' invention as will be discussed below.

Systems such as are discussed in "Cellular System Design: An Emerging Engineering Discipline", February, 1986, Vol. 24, No. 2, I.E.E.E. Communications Magazine, employs a second layer of service using the same antenna where the second layer of service covers only a part of the entire region. This provides an uneven level of service and, of course, does not use the frequency allocation and reassignment system that this invention provides.

This invention solves several known problems in the prior art systems. Specifically, the need for a frequency assignment strategy to provide greater utilization and effective capacity without the need for reduction in cell size.

The second known problem solved is the need to avoid any substantial occurrence of call cut-offs during operating periods when the system is substantially below full capacity.

This invention further solves the problem of assignment anomalies at cell boundaries.

This invention further solves the problems that occur in prior art systems due to occasional equipment failures and random spikes in usage that in prior art systems caused local cell blockage during periods of only moderate overall utilization.

This invention still further solves the problem of statistical degradation of total service by uncoordinated independent service providers each using a portion of the frequency spectrum, by providing a mechanism by which minimal coordinating standards can be set for competing providers to effectively statistically enhance overall service capacity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9a, 9b, 9c, 10a, 10b, 11a, 11b, 12a, 12b, 12c, 12d, 13, 14 and 15 are graphical representations necessary for understanding the hand-off mechanism;

DETAILED DESCRIPTION OF THE INVENTION

Obviously, numerous modifications and variations of the present invention are possible in light of the above teachings. It is, therefore, to be understood that within the scope of the appended claims, the invention may be practiced otherwise than as specifically described herein.

Figure 8A:
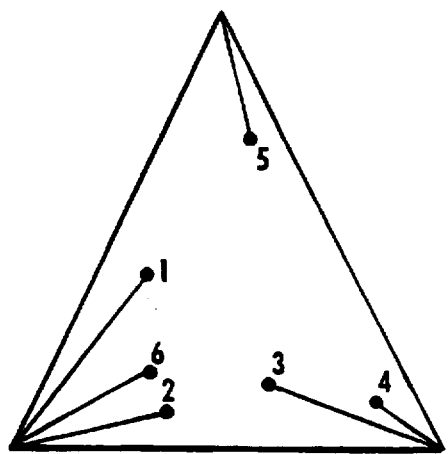
FIG. 8a graphically shows for a three-layer setup, the allocation method using a strongest signal scheme according to this invention.

As an example, a three-layer system is used as an illustration in a given geographic area serviced by three transceivers (one from each layer in a three-layer system), as shown in FIGS. 8a–8d, where the numbered dots are HHT's that are requesting a connection to the system in numerical calling order. In FIG. 8a, where the connection will go to is based, for example, on the strongest signal received by the HHT (generally the closest geographically) e as noted in FIG. 8a. Current state of the-art HHTs without additional equipment can provide the required information to perform this allocation, and a full description is omitted as one of ordinary skill in the art would readily understand the concepts involved. This is believed to be a good initial allocation of transceiver to HHT for fast-moving traffic.

Figure 8B:
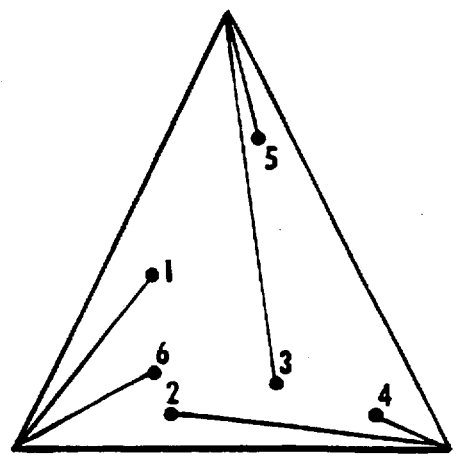
FIG. 8b graphically shows for a three-layer setup, the allocation method using a load balancing signal scheme according to this invention.

In FIG. 8b, which would be the best for slow-moving HHTS, a balancing of load between the three transceivers is used. This causes the number of HHTs per transceiver to be as close to the same as possible over a broad region. This allocation method serves to best spread the available frequencies over transceiver sites, thereby deferring the need for hand-offs, especially for slow-moving HHT traffic. This approach in a multiple service provider system may be a more useful allocation method than the allocation method of FIG. 8a.

Figure 8C:
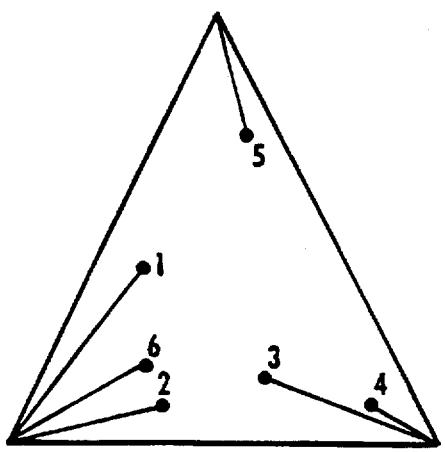
FIGS. 8c and 8d graphically show for a three-layer setup, the allocation method using a proportional availability scheme according to this invention.
Figure 8D:
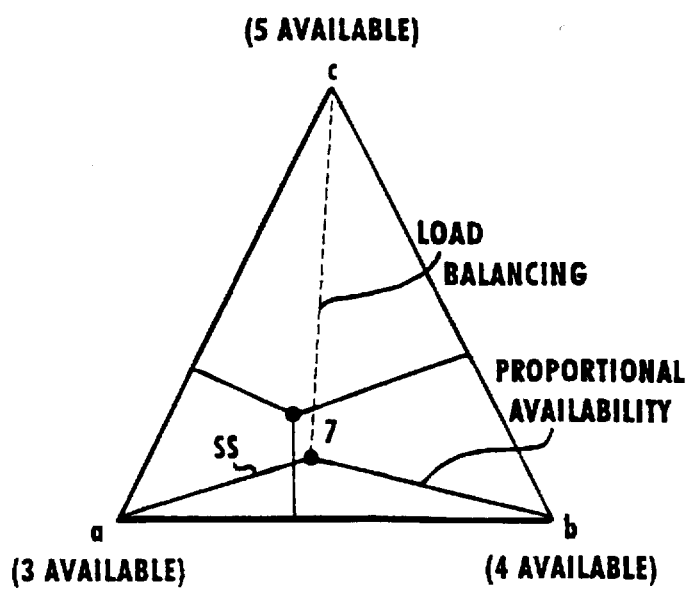

In FIGS. 8c and 8d, a method which the inventors call proportional availability is used for the allocation. In the simplest form, a simple function using signal strength and load balancing is used to provide for improvement in future requests for service (i.e. HHT No. 7 requesting service in FIG. 8d) and for the possibility of better handling of earlier boundary crossing. FIG. 8d further shows the possibilities of the different allocation strategies assigning HHT 7 to different transceivers.

Figure 4:
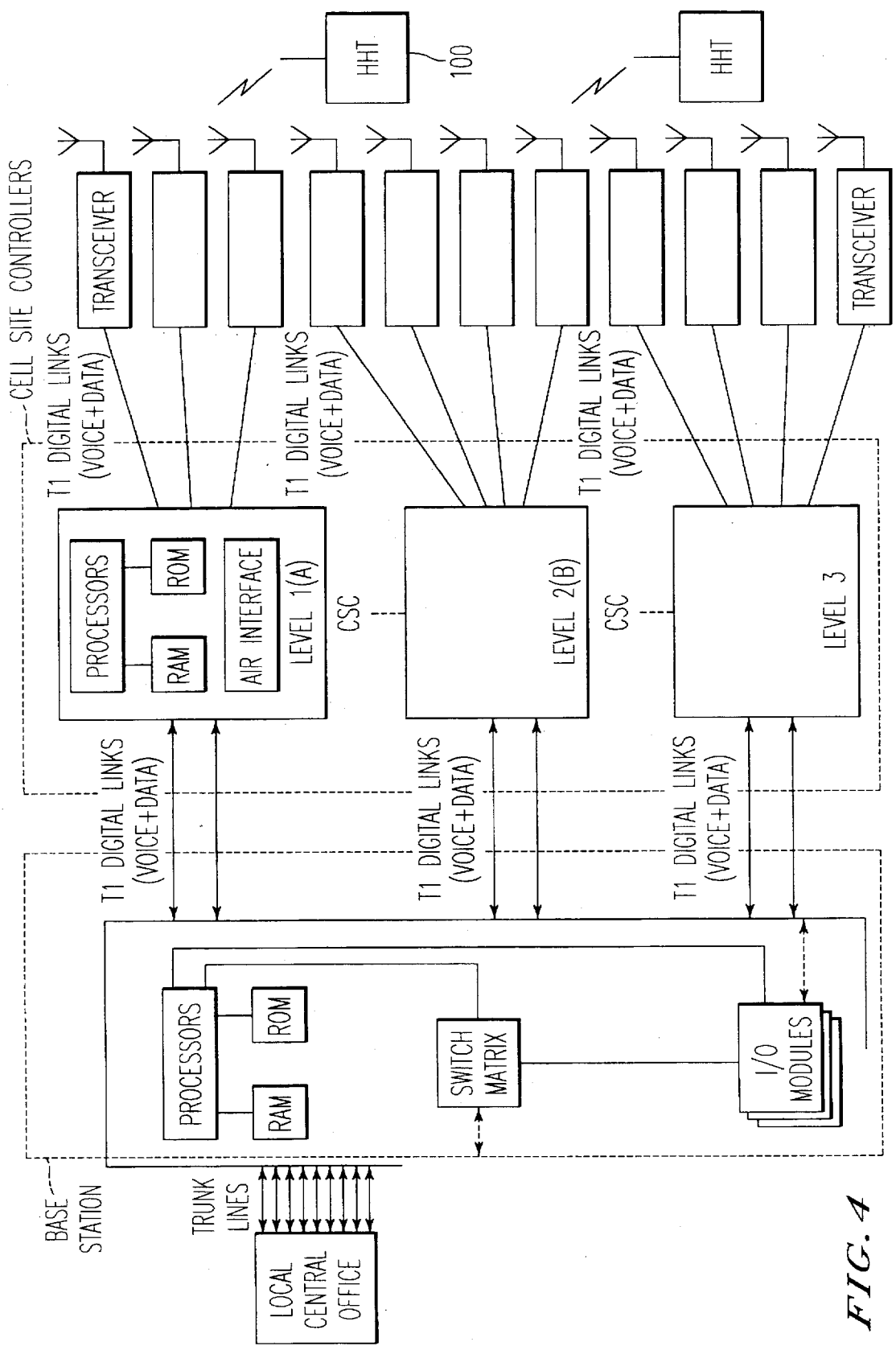
FIG. 4 is a system-wide diagram of an alternate embodiment of this invention allowing for multiple service providers.
Figure 5:
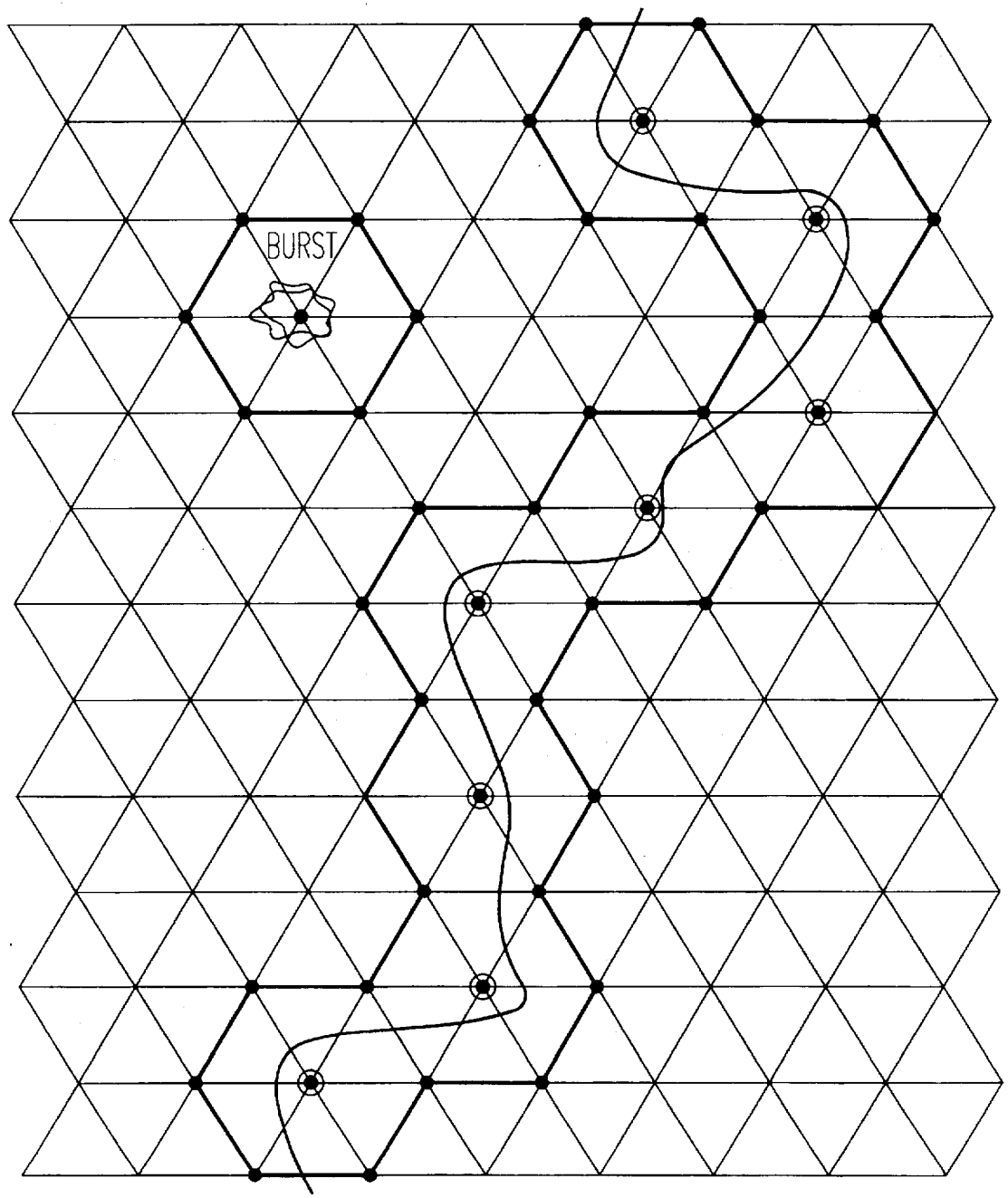
FIG. 5 is a diagram showing the capacity increase of this invention over the prior art along a road and in a "burst" area.

Alternatively, as noted with respect to FIG. 4, a hybrid approach to the allocation can be employed which can tare into account, for examples, multiple service providers or other reasons for which a preference other than signal strength or load balancing is taken into account. The allocation of available channels in the multi-layered system of this invention will now be described in reference to the flow chart of FIGS. 16a and 16b. As can be seen, as an HHT user initiates a request to place a call (i.e. a request for service), the given HHT searches for the strongest radio setup channel, identifying a channel from the multi-levels. For the purposes of this discussion, call this level A, through a transceiver of level a. A request for service message will then travel over a link to the CSC and then to the BSC. The CSC or the BSC, if necessary, then directs those transceivers from the other levels (B and C in this case) whose range overlaps the particular transceiver from the A level to monitor the signal strength of the HHT to determine the closest level B and level C transceivers.

The CSC then assigns one of the three transceivers from levels a, b or c to service the communication request based on an algorithm that will factor in the relative strength of the signals and the available frequencies at each of the three transceivers. This allows for using the strongest signal, load balancing and proportional allocation.

The communication then proceeds through the conventional process of authentification, digit collection, analysis, validation and other call set-up functions. The link between an HHT and a transceiver is over the air using any of the known RF link methodologies. The links from a transceiver to a CSC and CSC to BSC are preferably made by wire and/or microwave, but can also be by fiber optic or other means.

If the user moves out of the cellular area covered by the assigned transceiver or the system needs to reallocate the transceiver, a hand-off employing a methodology, which will be set forth below, or even a conventional hand-off, can be used to maintain the communication links. The call will only be terminated by the system if no new connection can be founds; however, as will be set forth below, the probability of this occurring using the hand-off mechanism of this invention decreases over prior art systems dramatically.

In the arrangement shown using a "three-layer embodiment" shown in FIG. 2, various hand-offs between individual elements within the cell can occur by various mechanisms and procedures. By having the multiple transceivers in the layered arrangement, the hand-off system can be optimized, and the usage of the system when there is a passage of an HHT through the system can be improved. This arrangement and hand-off methodologies allow a more uniform usage of the freguencies involved in the entire system and additionally allows a system in which multiple service providers may use or share the frequency bandwidth more advantageously. Further, some or most of the techniques that have been used to increase conventional systems capacity can also be used to provide further increases in this invention's capabilities.

Figure 1:
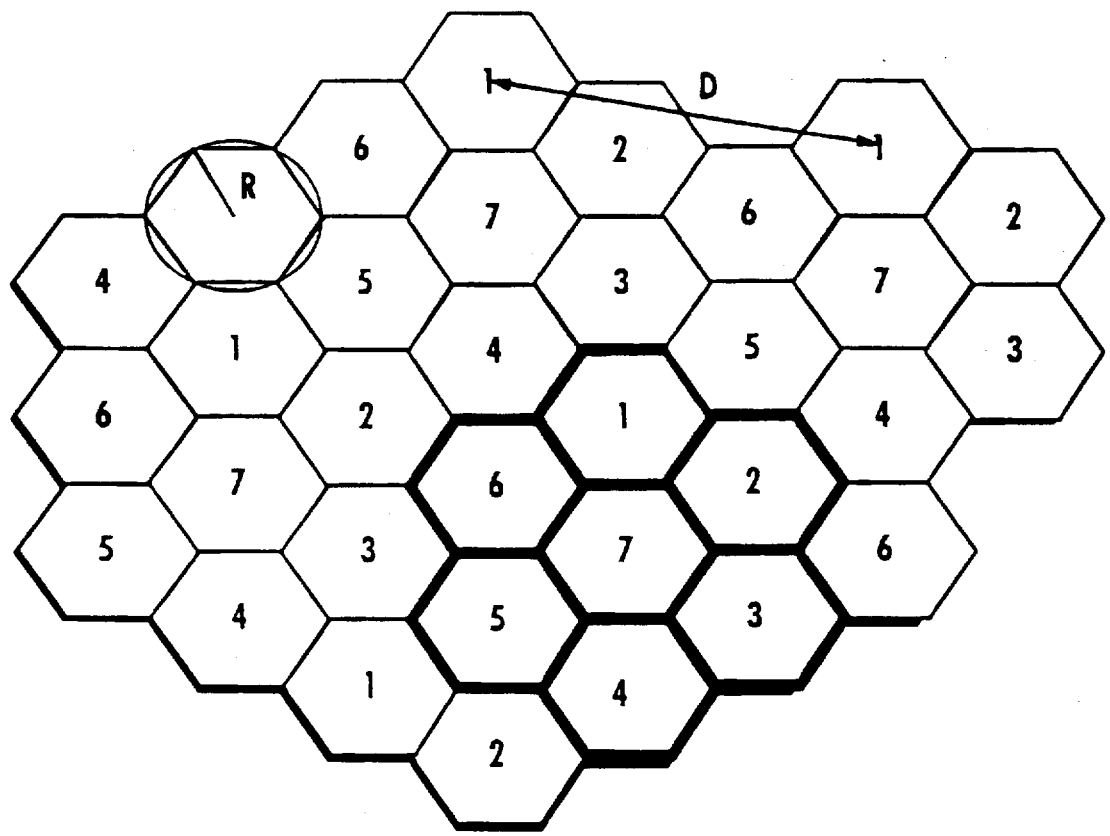
FIG. 1 is a graphical description of the seven-cell repeat arrangement of cells in a conventional cellular network.
Figure 2A:
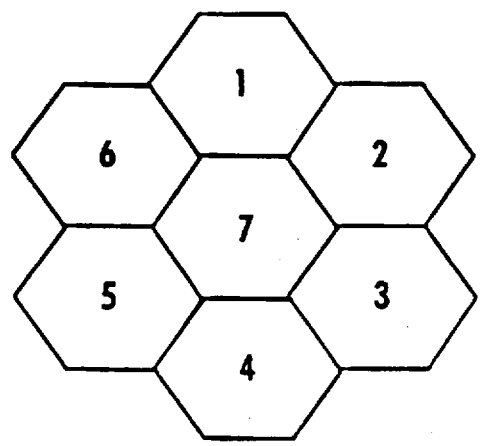
FIG. 2a is a graphical representation arrangement of a conventional system.
Figure 2B:
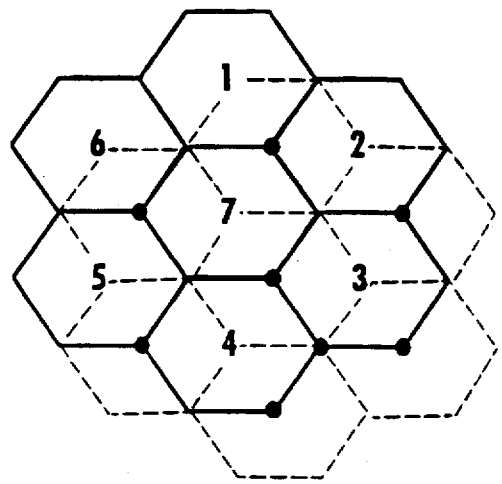
FIG. 2b is a graphical representation of a corresponding two-layer system.
Figure 2C:
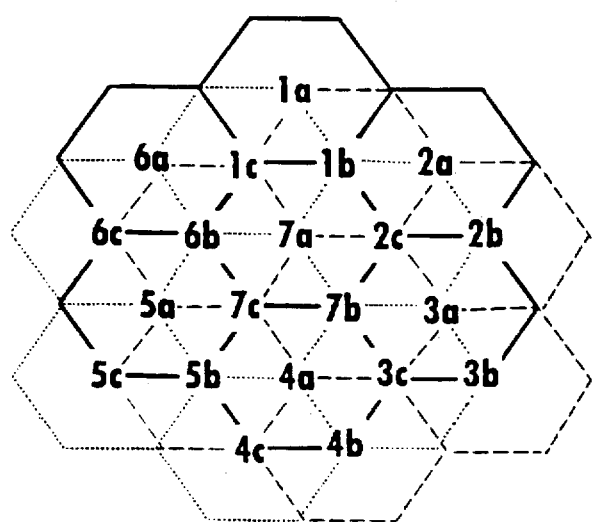
FIGS. 2c and 2d are graphical representations of a three-layer system according to this invention and a three-layer embodiment of this invention, in which the triangular cellular nature of the distinguished overlapped coverage areas are shown.
Figure 2D:
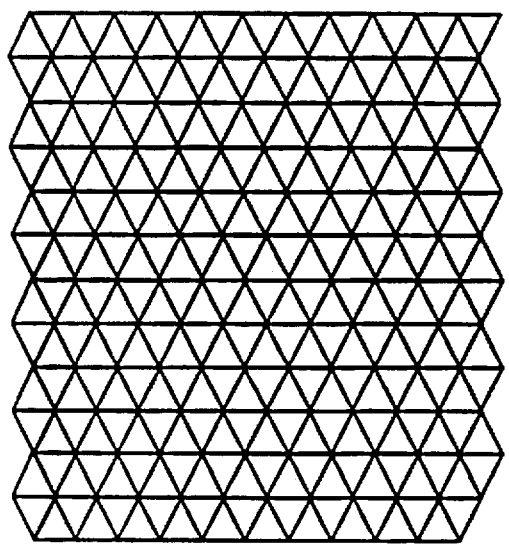
Figure 3:
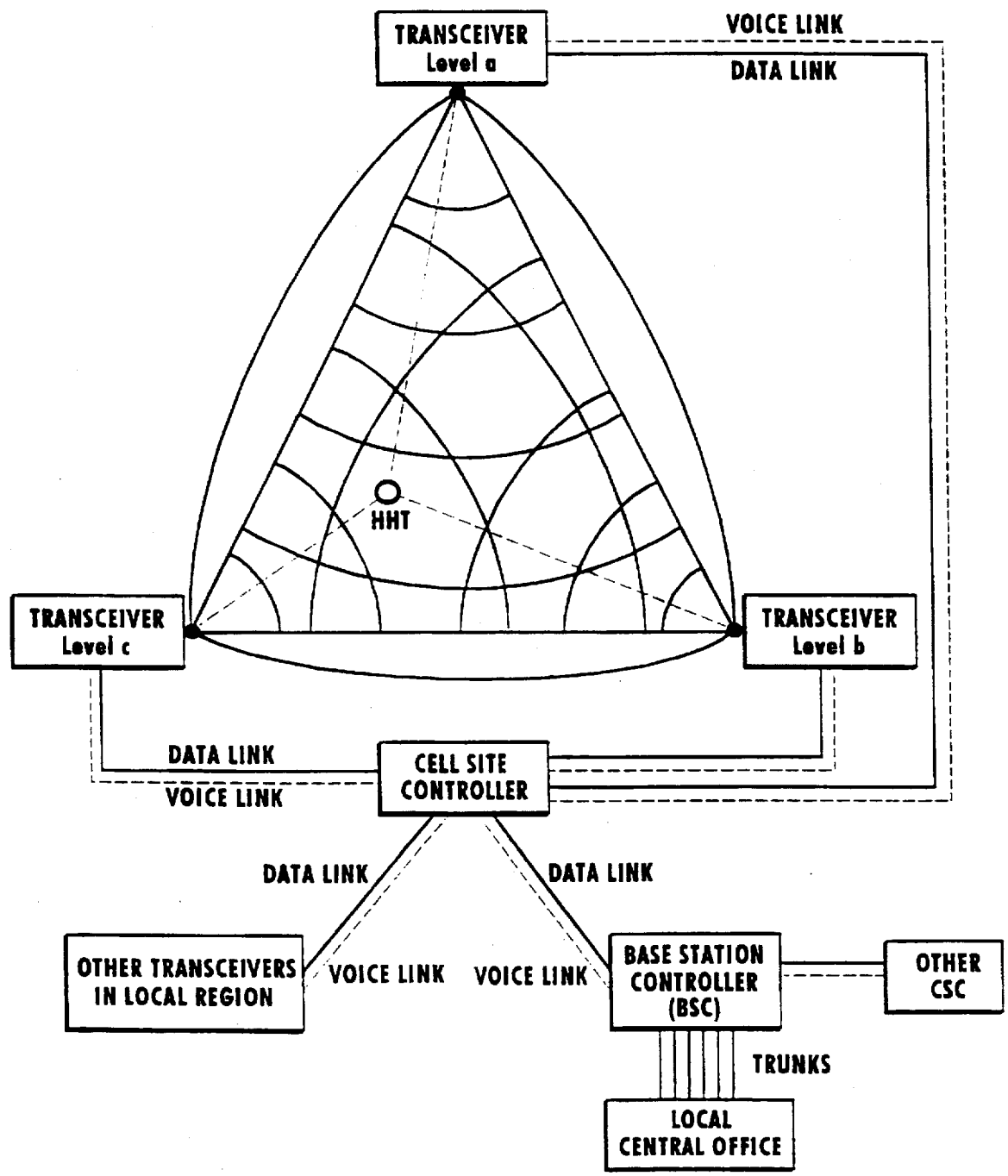
FIG. 3 is a system-wide implementation diagram of one embodiment of this invention.

In this invention, as shown in FIGS. 2c and 2d, a greater level of service can be provided. Specifically, in FIG. 9a, if X represents a cell transceiver and Y represents a hand-held unit in the cell, and if X covers Y (i.e. Y is located within X's service range), a solid line will connect X and Y as shown in FIG. 9a. If Y has been served by X (i.e. a channel is assigned to Y from the tranceiver X), a broken line will connect X and Y. A broken and solid line indicates a covered, as well as an assigned, frequency and a solid line indicates covered but not yet assigned frequency.

Figure 6A:
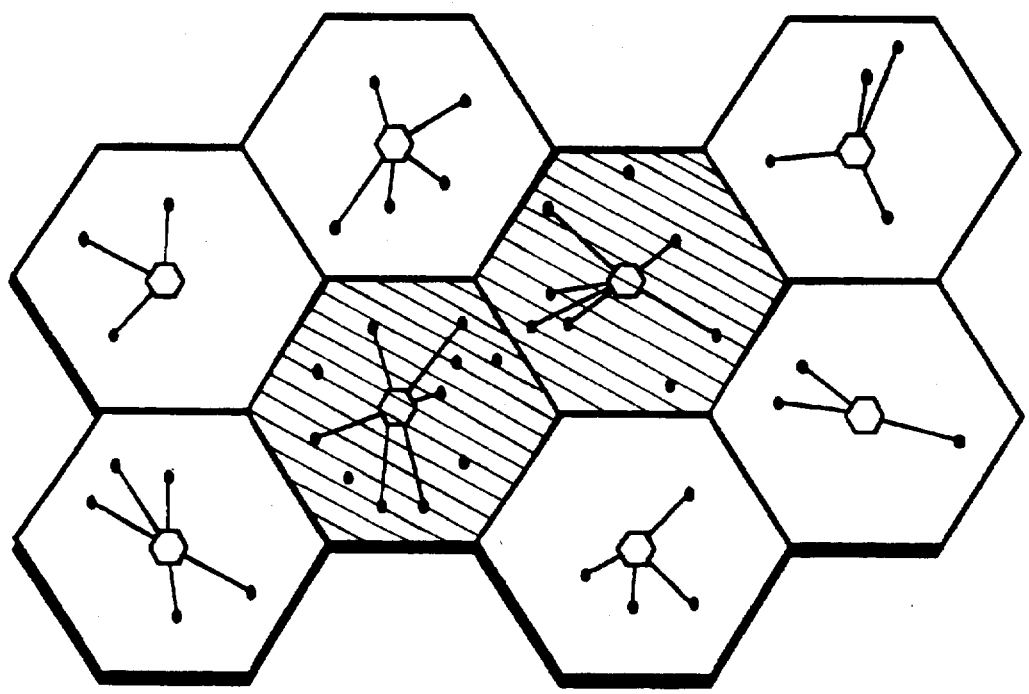
FIGS. 6a and 6b are a graphical representation showing the improvement between a conventional hexagonal cell system and the capacity of a three-layer triangular cell implementation of this invention.
Figure 6B:
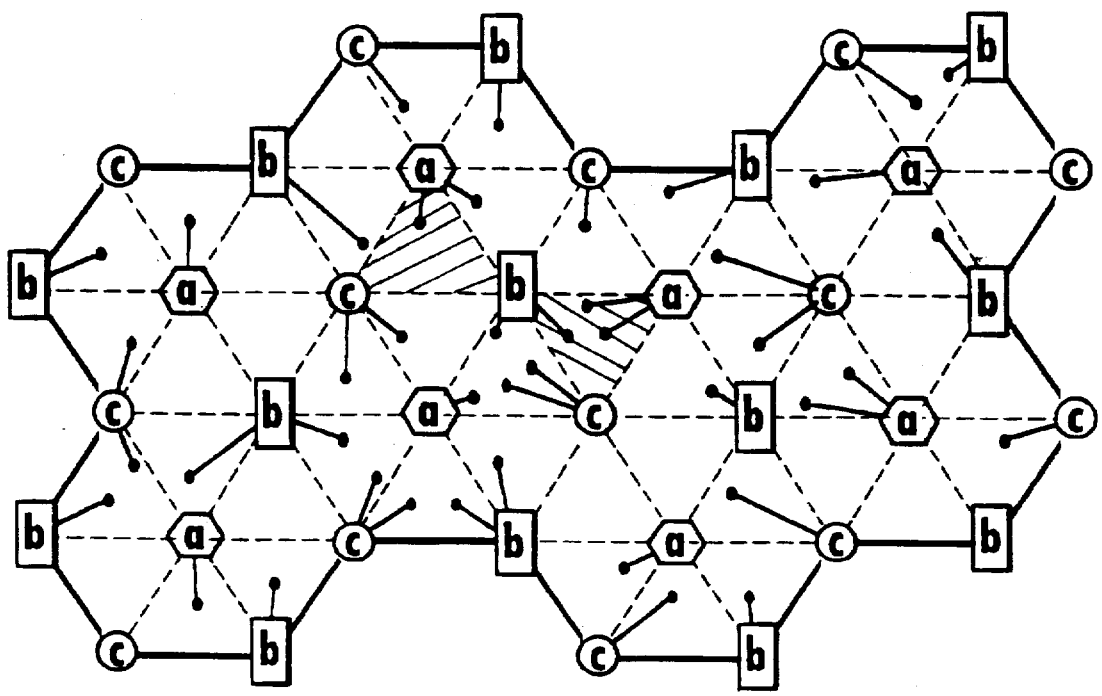
Figure 10A:
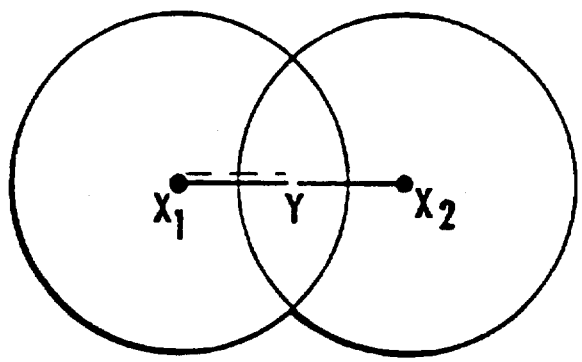
Figure 10B:
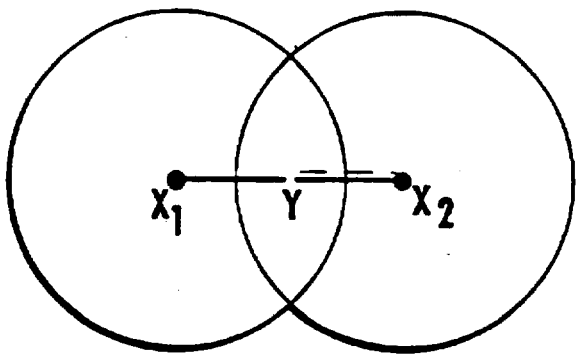
Figure 11A:
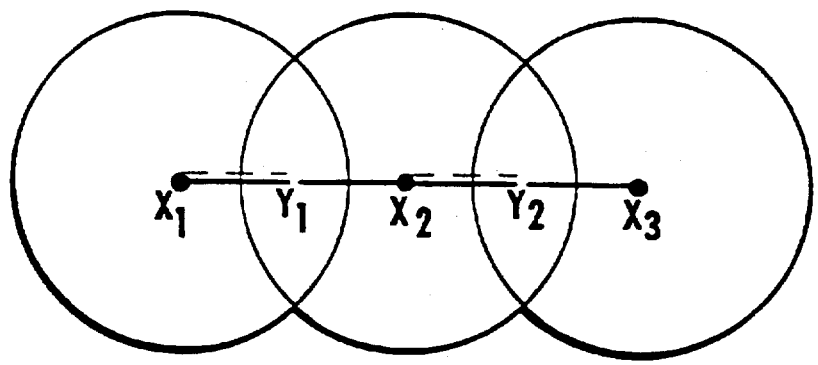
Figure 11B:
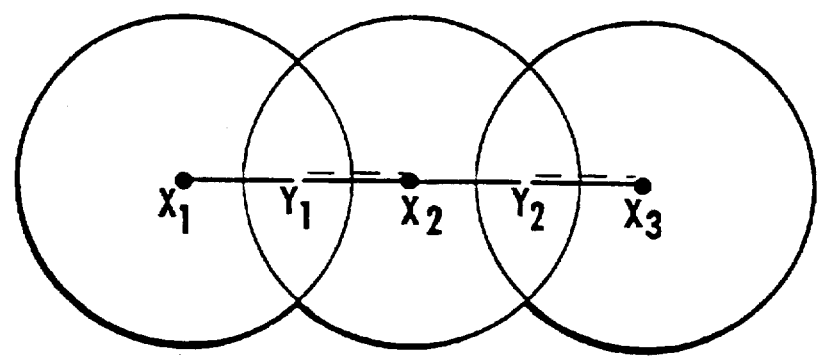
Figure 12A:
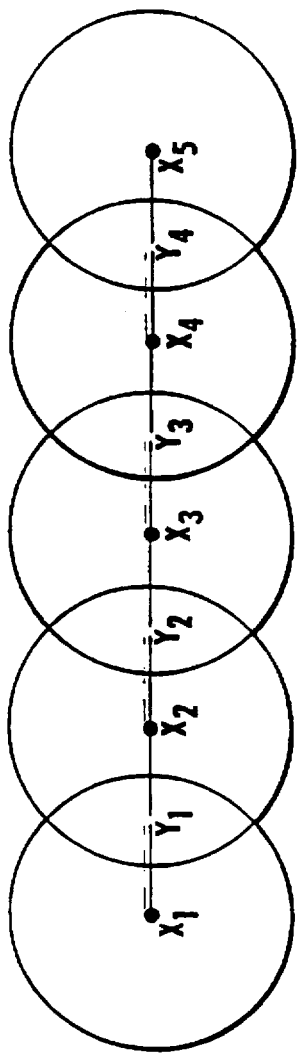
Figure 12B:
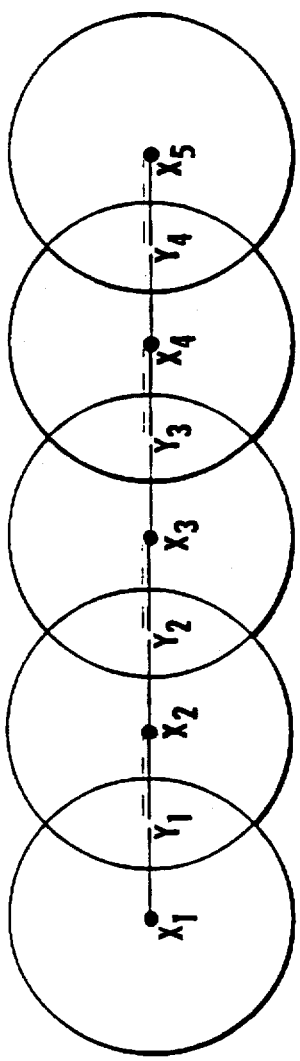
Figure 12C:
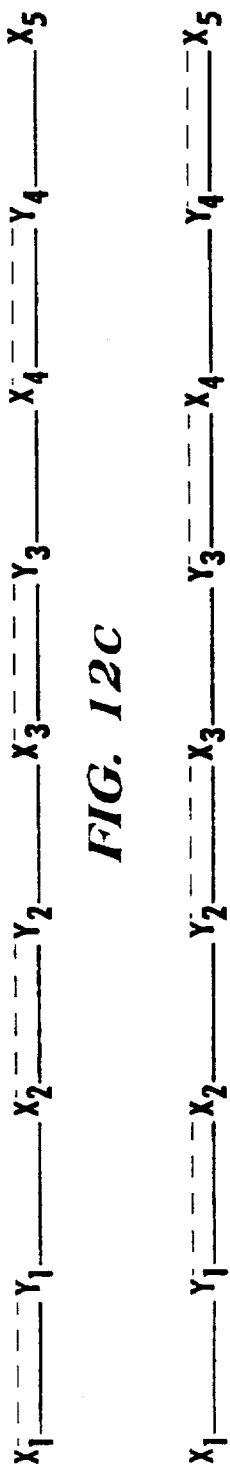
Figure 12D:

For example, as shown in FIG. 9b, if the hand-held transceivers Y1 and Y2 are in the service area of cell X1, but Y3 is not in the service area, Y2 is being serviced by X1. To illustrate the hand-off chain concept of this invention, an alternating path would be shown as in FIG. 9c, with the edges alternating between covered but not assigned and covered and assigned frequencies. In the example shown in FIGS. 10a and 10b, a single hand-off of the hand-held unit Y is shown between the cell sites X1 and X2 where there is an overlap between X1 and X2. A double hand-off of HHTs is shown in FIGS. 11a and 11b, using, for example, the cell sites X1, X2 and X3. By having extensive overlap of the cells in the triangular grid arrangement shown in FIG. 6b, the passage of a given HHT through the system can be more easily accomplished. Note in FIG. 6b that a single hand-off would free a channel in either of the saturated triangular cells (shaded). Furthermore, a chain of hand-offs, as shown in FIGS. 12a, 12b, 12c and 12d, can likewise be achieved, traffic in individual cells, thereby using the frequency band-width much more efficiently.

Figure 13:
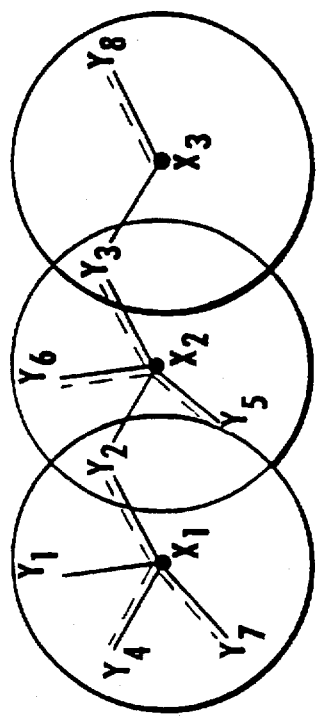

As shown in FIG. 13, using the cell sites X1, X2 and X3 as an example, the hand-held transceiver Y1, which is generally in the service area of X1, may be unable in a conventional system from achieving a connection because a given cell X1 would or could be saturated or, for that matter, out of service or could not provide service for some reason. However, as shown in FIGS. 14 and 15, transceiver X1 can provide service for a "new" HHT in this area in this invention.

Figure 14:
Figure 15:

In the above example of FIG. 13, even if X2 is also saturated but X3 is not, it is possible to find an alternating path for the HHT Y1 which is terminated at X3 (a transceiver station with a free frequency) by doing the chain of hand-offs to serve Y1 by using the alternating path shown in FIG. 14. By first handing off Y3 to X3, then Y2 to X2, a free channel is then made available in X1 to serve Y1. Afterwards, a hand-off sequence could occur as shown in FIG. 15. This allows for an HHT to enter a saturated cell or to originate a phone call in a saturated cell, preventing the blocking problem that occurs in prior art systems.

What occurs in this invention is a solution to the blocking problem that occurs in conventional single-layer cell arrangements, and in which a feature of Applicants' invention is that an alternating path that starts from a given HHT and ends at a transceiver with free frequencies is employed. This uses the augmenting path graph theory and which follows the flow diagram shown in FIGS. 16a and 16b. Using conventional graph theory terminology to assign a frequency from a base station to a hand-held transceiver would be equivalent to the matching that occurs in conventional graph theory if the transceiver has K frequencies to be assigned. This will be a K-matching problem in bipartite graphs. Starting from Y to find the augmenting path that ends at X, with the breadth first search being guaranteed to find the shortest path (for example, the least number of hand-offs required), and which is linear in time (i.e. the number of steps to find the path is proportional to the size of the path found plus the number of HHTs searched). The following are definitions:

Q—FIFO Queue (first in, first out queue)

K—Let K be the number of channels allocated to cell tranceiver X.

Empty Qx—initialize Qx to be an empty queue

Empty Qy—initialize Qy to be an empty queue

Mark x—initialize mark flag for x

Mark y initialize mark flag for y

Qx←x—enter x into bottom of Qx

Qy←y—enter y into bottom of Qy

Figure 16A:
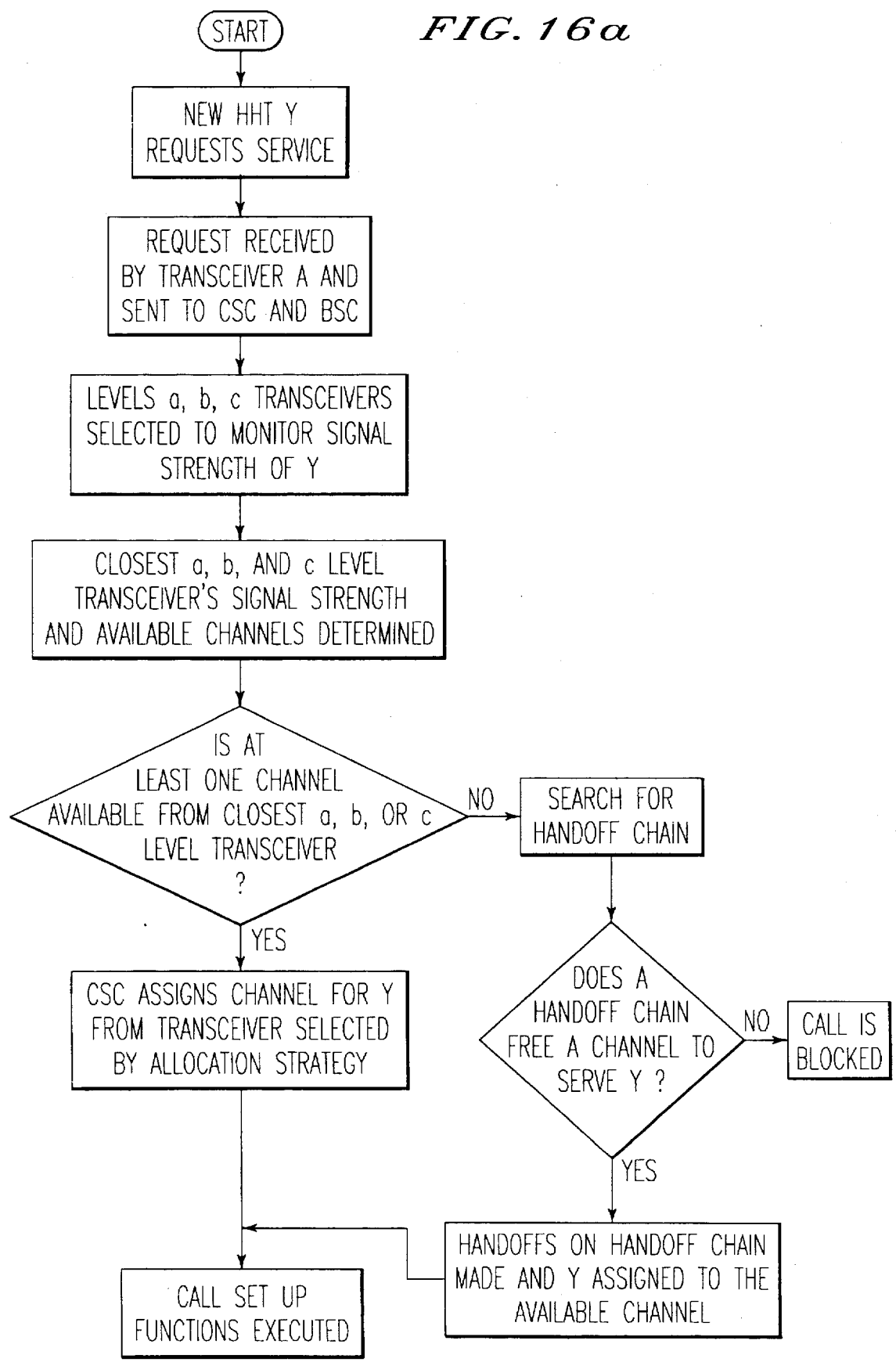
FIGS. 16a and 16b are a flowchart showing a hand-off mechanism according to this invention.
Figure 16B:
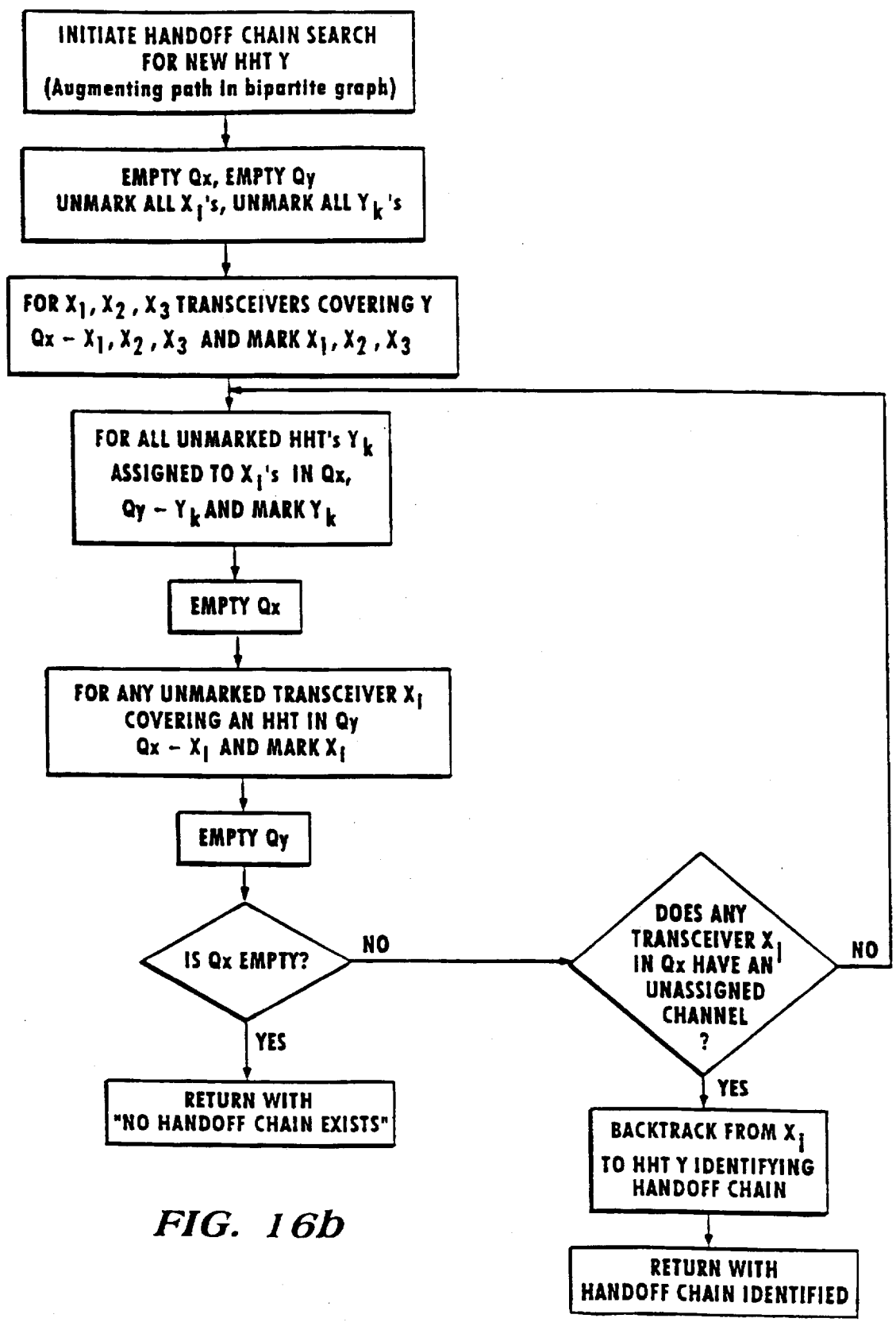

This follows the flowcharts as set forth in FIGS. 16a and 16b.

The hand-off chain algorithm will not work when an HHT user crosses a boundary within a blocked region (i.e. a region where all frequencies in every transceiver are busy, and no hand-off chain to an available frequency is possible), unless frequency substitution is made as follows: When the algorithm fails to find a hand-off chain for the HHT's new call, the previous frequency is released as an available frequency and the hand-off chain search is re-initiated.

Figure 7:
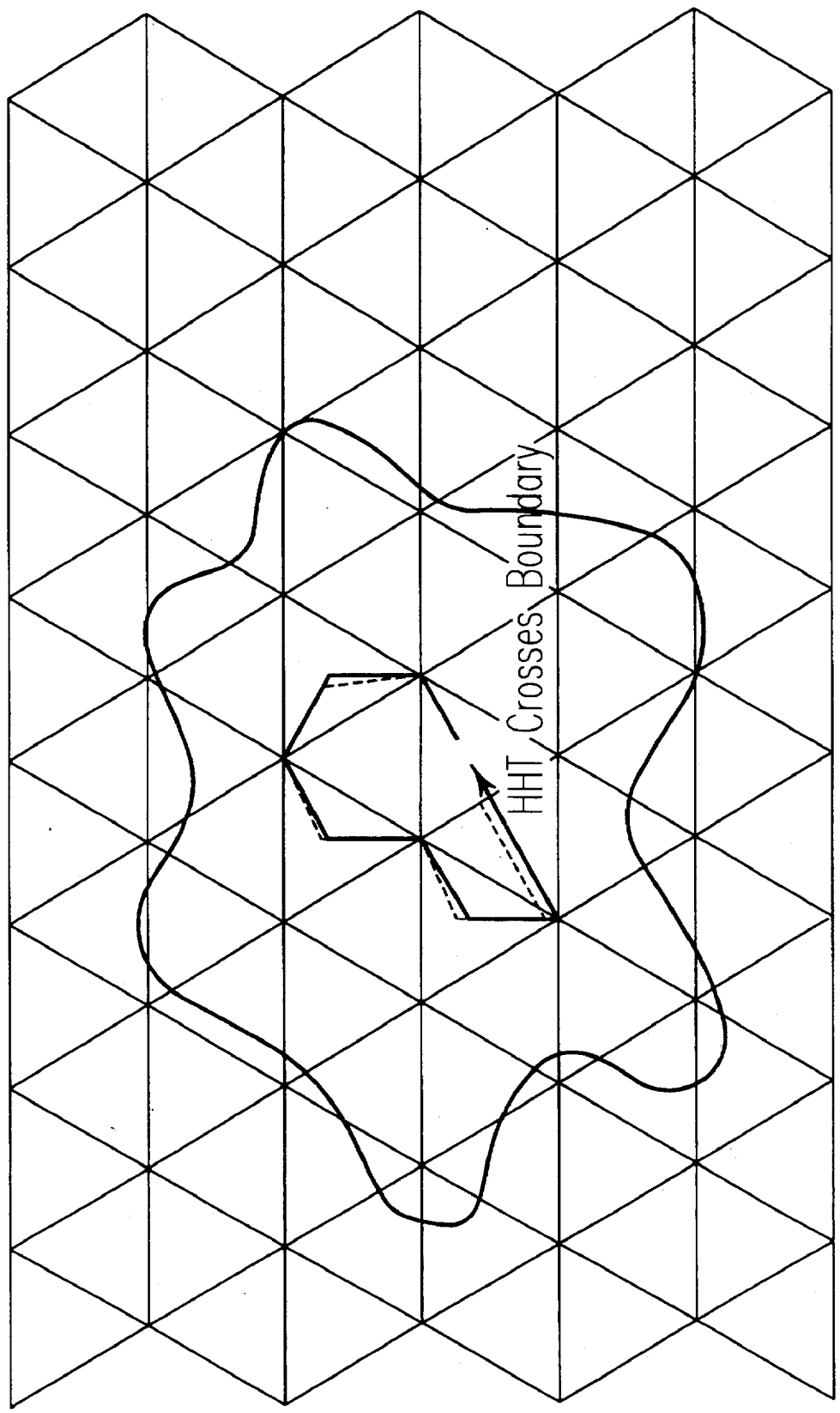
FIG. 7 graphically shows a frequency substitution methodology used to extend the use of a hand-off algorithm to blocked areas in this invention.

If a hand-off chain is then found as shown in FIG. 7, the tail end of this chain will be the frequency just added. (This chain is a loop, since the head and tail of the chain are the same.) The above extension of the hand-off algorithm by frequency substitution will allow an HHT to move from cell to cell in a totally blocked region.

But there is a drawback—the hand-off operation will cause the HHT to suffer a transitory communication loss. The current technology requires a bridging period and switching period during the hand-off operation between the "hand-off from" and "hand-off to" frequencies to be transparent. These consist of:

a) Bridging (carrying the call on both frequencies); and b) Actual switching between the two frequencies. In an unblocked area (having a frequency available for bridging), loss of communication only occurs during step b (e.g. approx. 100 microseconds). In a blocked area, the HHT frequency must be surrendered for bridging, so communication loss occurs during both steps a and b.

To implement this frequency substitution to allow an HHT user to move across a cell boundary in a blocked-region, the longer the hand-off chain, the greater the communication loss period. But this drawback only applies to the HHT at the head of the hand-off chain, i.e. the one whose movement necessitated the hand-offs. Also, a limit can be imposed on use of the substitution (i.e. such a substitution will be allowed only when the hand-off chain is short enough to ensure that the loss of communication will not exceed a preset acceptable loss duration).

What is claimed as new and is desired to be secured by Letters Patent of the United States is:

1. A load balancer for use in a cellular communication system for communicating with mobile phones and including a plurality of base stations, for communicating with said mobile phones, each of said base stations coupled to a plurality of transceivers, each of said plurality of transceivers defining a cell in which the transceiver selectively provides frequency channel assignments to said mobile phones within said cell, the cells being arranged in a cellular pattern, said transceivers covering a geographic service area and being partitioned such that respective cells form plural cellular layers of communication, each of the plural cellular layers substantially covering all of said geographic service area; substantially all of the cells of each of the plural cellular layers overlapping a plurality of cells in each other cellular layer such that at least first and second transceivers from different cellular layers of the plural cellular layers selectively provide a frequency channel assignment to a requesting mobile phone requesting a frequency channel assignment within the geographic service area, the load balancer comprising:

a selector for selecting between at least first and second transceivers from the different cellular layers based on load balancing between said at least first and second transceivers, such that a selected one of said at least first and second transceivers and a corresponding base station of said plurality of base stations provide said frequency channel assignment for said requesting mobile phone.

2. A system as in claim 1, wherein said selector includes means for obtaining said frequency channel assignment for said requesting mobile phone by causing the selected transceiver to hand-off another mobile phone that is currently assigned said frequency channel assignment to another frequency channel assignment provided by a third transceiver defining a respective cell in one of the plural cellular layers, said requesting mobile phone being outside the cell of said third transceiver.

3. A method of assigning a frequency channel to a requesting mobile phone requesting a frequency channel assignment in a cellular communication system that includes a plurality of base stations, each base station coupled to a plurality of transceivers, each transceiver defining a respective cell, the cellular communication system including first and second transceivers defining respective first and second cells, each of the first and second transceivers selectively providing frequency channel assignments to requesting mobile phones within the respective first and second cells, the first and second cells being arranged in an overlapping cellular pattern covering a geographic service area, said overlapping cellular pattern being arranged such that each cell overlaps a plurality of other cells, thereby defining a plurality of respective overlap regions such that, within a given overlap region, a requesting mobile phone is able to receive a frequency channel assignment from a transceiver for any cell covering such overlap region, the method comprising the steps of:

assigning to a first requesting mobile phone a first frequency channel assignment from said first transceiver, said first requesting mobile phone being within an overlap region defined by an overlap of the first cell defined by said first transceiver and the second cell defined by said second transceiver;

assigning to a second requesting mobile phone a second frequency channel assignment from said second transceiver, said second requesting mobile phone being within said overlap region;

receiving at said first transceiver a handoff request for a new frequency channel assignment from said second requesting mobile phone that is within the first and second cells but is moving out of the second cell; and responsive to receiving the handoff request from said second requesting mobile phone, the method further comprising the sub-steps of:

releasing said second frequency channel assignment;

handing-off said first requesting mobile phone to said second frequency channel assignment from said second transceiver;

releasing said first frequency channel assignment; and reassigning said first frequency channel assignment to said second requesting mobile phone.

\* \* \* \* \*